United States Patent [19]
Eardley et al.

[11] Patent Number: 6,122,179
[45] Date of Patent: Sep. 19, 2000

[54] MOUNTING TREE FOR POWER TRANSFER DEVICES USED IN HYBRID FIBER/COAXIAL SYSTEMS

[75] Inventors: Edward C. Eardley, Piscataway; Alfred W. King, Mine Hill, both of N.J.; Eric M. Lington, Loosdrecht, Netherlands; Peter A. Michaels, Jr., Randolph, N.J.; Gerrit M. Moesbergen, Woudenberg, Netherlands

[73] Assignee: Lucent Technologies Inc., Mountainside, N.J.

[21] Appl. No.: 09/106,398

[22] Filed: Jun. 29, 1998

[51] Int. Cl.[7] .................................................. H02B 1/04

[52] U.S. Cl. ...................... 361/825; 312/223.1; 455/347

[58] Field of Search ...................... 312/223.1; 174/52.1, 174/59; 455/347–349; 361/807, 809–811, 600, 601, 825–827

[56] References Cited

U.S. PATENT DOCUMENTS

| | | |
|---|---|---|
| 3,828,937 | 8/1974 | Nash . |
| 4,133,507 | 1/1979 | Chervenak . |
| 5,690,415 | 11/1997 | Krehl . |
| 5,912,801 | 6/1999 | Roy . |
| 5,918,432 | 7/1999 | Mahone . |

*Primary Examiner*—Gerald Tolin
*Attorney, Agent, or Firm*—Jean-Marc Zimmerman

[57] ABSTRACT

A mounting tree for power transfer devices such as those used in hybrid fiber/coaxial systems. The mounting tree is installed inside an outdoor cabinet housing the power transfer devices. The mounting tree is located in a corner of the cabinet that is partially exposed to the outside environment. An intermediate mounting bracket is used to attach the mounting tree to the cabinet. The intermediate mounting bracket is permanently installed near the aforementioned corner such that the power transfer devices may be installed on the mounting tree before the tree is attached to the intermediate mounting bracket inside the cabinet.

20 Claims, 5 Drawing Sheets

MOUNTING TREE FOR POWER TRANSFER DEVICES USED IN HYBRID FIBER/ COAXIAL SYSTEMS

FIELD OF THE INVENTION

The present invention relates to the field of outdoor cabinets for housing electrical components and cables, and more particularly to a tree assembly for mounting power transfer devices in such cabinets.

BACKGROUND OF THE INVENTION

Outdoor cabinets for housing electrical components are widely used in cable television (CATV) and other kinds of systems. These cabinets must protect the electrical components housed therein from harsh environmental conditions such as adverse weather. In addition, these cabinets must be secure to protect the electrical components inside from tampering and vandalism. It is also desirable that these cabinets allow easy access to the electrical components therein to facilitate their installation and servicing. Also, these cabinets should be as small and inconspicuous as possible. Finally, these cabinets should be relatively inexpensive to manufacture.

Conventional cabinets of the type just described have some of the foregoing characteristics, but they also have several drawbacks. Specifically, the space inside such cabinets is not always efficiently utilized. For example, the space occupied by attached cables sometimes prevents components from being mounted in a tightly packaged manner. Also, additional space is typically required to allow access to the components during installation and servicing. Without this access space, components may have to be removed from the cabinet in order to be serviced. Finally, conventional cabinets are unable to house the larger numbers of components required by CATV systems.

It is therefore an object of the present invention to create an outdoor cabinet suitable for use in cable telephony systems. It is another object of the present invention to provide a low cost, compact, outdoor electrical cabinet. It is a further object of the present invention to provide an efficient way to mount electrical components inside a cabinet that allows the components housed therein to be easily installed and serviced while minimizing the overall cabinet size.

SUMMARY OF THE INVENTION

The present invention includes an assembly for mounting passive electrical components inside of an outdoor electrical cabinet. The mounting assembly is installed in a corner area of the cabinet not typically used for such purposes, thereby allowing more components to be housed in the cabinet without having to increase its size. Use of the corner location is made possible by configuring the electrical components mounted on the mounting assembly such that all attached cables protrude at right angles from such components. An intermediate mounting bracket is permanently installed on the side of the cabinet near the aforementioned corner. A component mounting tree onto which the components are first affixed is then placed in the cabinet and mounted to the intermediate bracket in such a way that allows the mounting tree to be easily installed and removed. In the preferred embodiment, the mounting tree has a plurality of mounting surfaces formed out of a single piece of metal or other material.

The permanently installed intermediate mounting bracket allows components on the mounting tree to be installed and removed without having to replace hardware mounted through the outer walls of the cabinet. In addition, the aforementioned configuration allows cables to be attached or removed from the enclosed components without having to remove the components from the mounting tree.

BRIEF DESCRIPTION OF THE FIGURES

A more complete understanding of the present invention may be obtained from consideration of the following detailed description in conjunction with the accompanying drawings in which.

DETAILED DESCRIPTION OF THE DRAWINGS

The following detailed description relates to an outdoor cabinet suitable for housing electrical components and cables. Although the invention is described in a preferred embodiment as a cabinet for a cable telephony system, many other kinds of systems having outdoor electrical cabinets may benefit from use of the inventive structures described herein and are considered to be within the teachings of the present invention.

Figure 1:
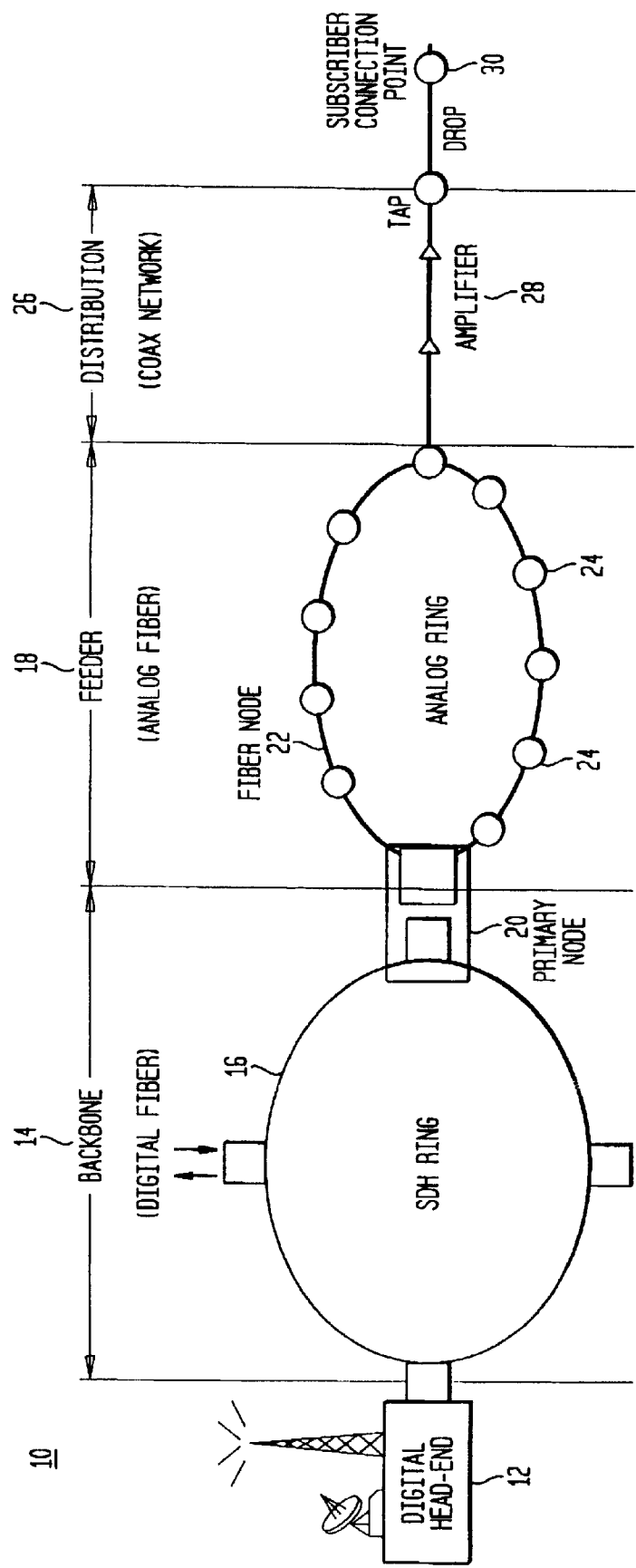
FIG. 1 shows a diagram of a cable telephony system.

FIG. 1 shows an exemplary cable telephony system 10. A CATV head end 12 receives electrical signals and transmits them to a digital fiber optic backbone network 14 which includes an SDH ring 16. These digital signals are then transmitted to an analog fiber feeder network 18 through a primary node 20. The feeder network 18 processes these signals in an analog ring 22 made up of fiber nodes 24. In the fiber nodes 24, the broadband fiber optic signals are converted to coaxial signals via a CATV wideband transmission shelf 34 shown in FIG. 2. These coaxial signals then are routed to a coaxial distribution network 26 which includes an amplifier 28. The amplified coaxial signals are then sent to the subscriber connection point 30.

Figure 2:
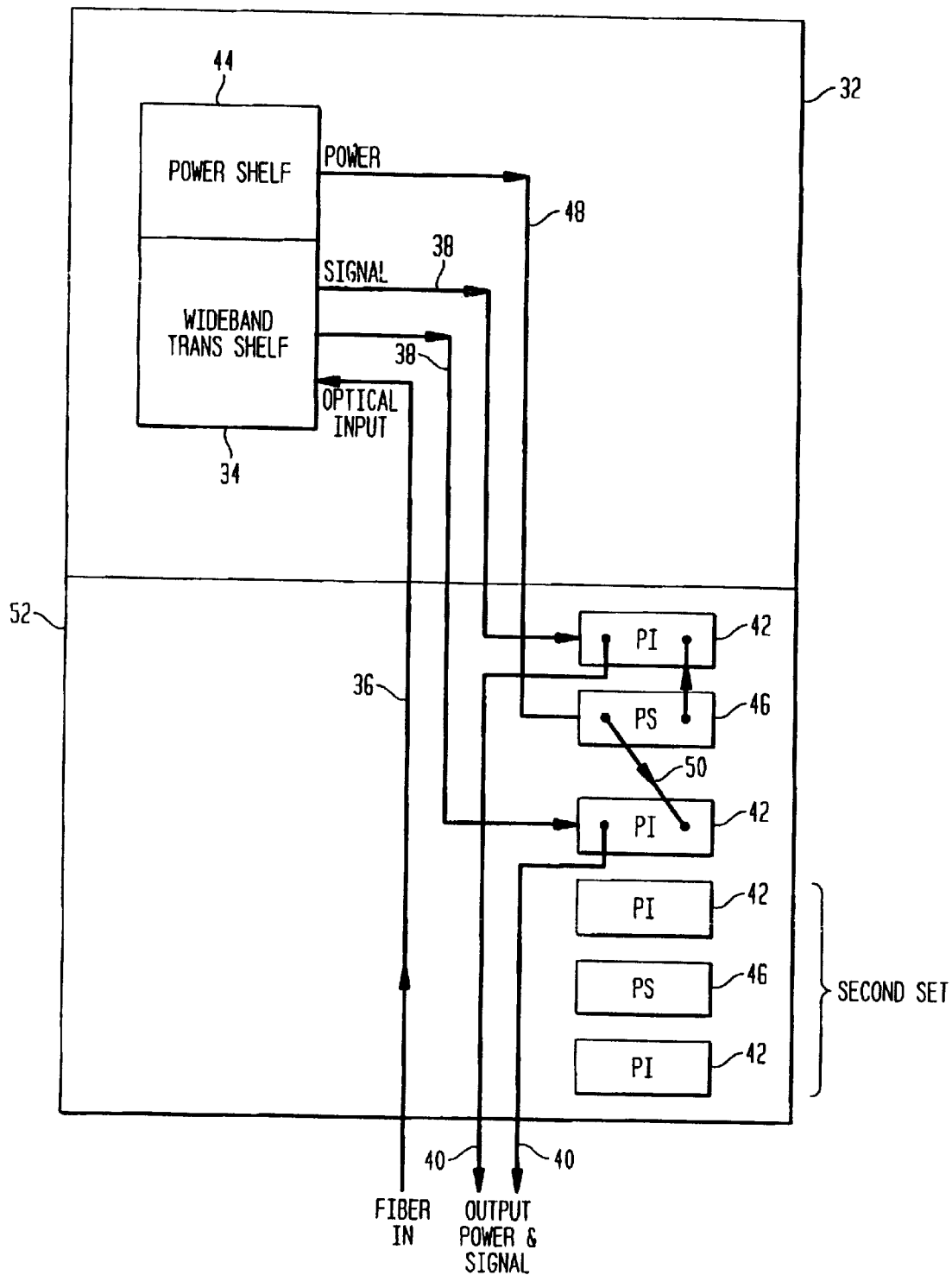
FIG. 2 shows the functional elements typically found inside of an outdoor cabinet for the cable telephony system shown in FIG. 1.

The fiber nodes 24 are housed in an outdoor cabinet 32 shown in FIG. 2. A CATV wideband transmission shelf 34 converts the broadband fiber optic signals received on line 36 to coaxial signals 38. Coaxial cables 40 exit from the cabinet 32 after passing through coaxial power inserters 42 that insert AC power onto the coaxial line to power downstream electronics. The AC power originates from a power shelf 44 that is able to supply only two output paths to two power splitters that split power into four output AC paths. This allows power to be inserted onto four coaxial lines via power inserters. This is accomplished by use of a power splitter 46 to split a single power line 48 into two separate power lines 50 that each supply power to a different power inserter 42.

Following the signal path in the opposite direction, upstream signals from the coaxial distribution network 26 are converted to fiber optic signals through the CATV wideband transmission shelf 34. These signals are then transmitted back to the head end 12 through the primary node 20.

Power passive devices, such as the power inserters 42 and the power splitters 46, are relatively large-sized components that occupy a great deal of space in conventional cabinets. In order to utilize the space available in a cabinet most efficiently, and thus avoid having to use larger cabinets to house such devices, the present invention houses them in a lesser protected cable entry area 52 of the cabinet 32. This area is not normally used to house such devices because it is exposed to the outside environment through an opening through which cables are brought into the cabinet, and through which it was believed that the adverse weather would damage such devices. However, since power passive devices are typically attached directly to a pole-to-pole strand in aerial CATV networks, they do not in fact need to be protected from the outside environment. Accordingly, the cable entry area 52 of the cabinet 32 is suitable for mounting such devices.

Figure 3:
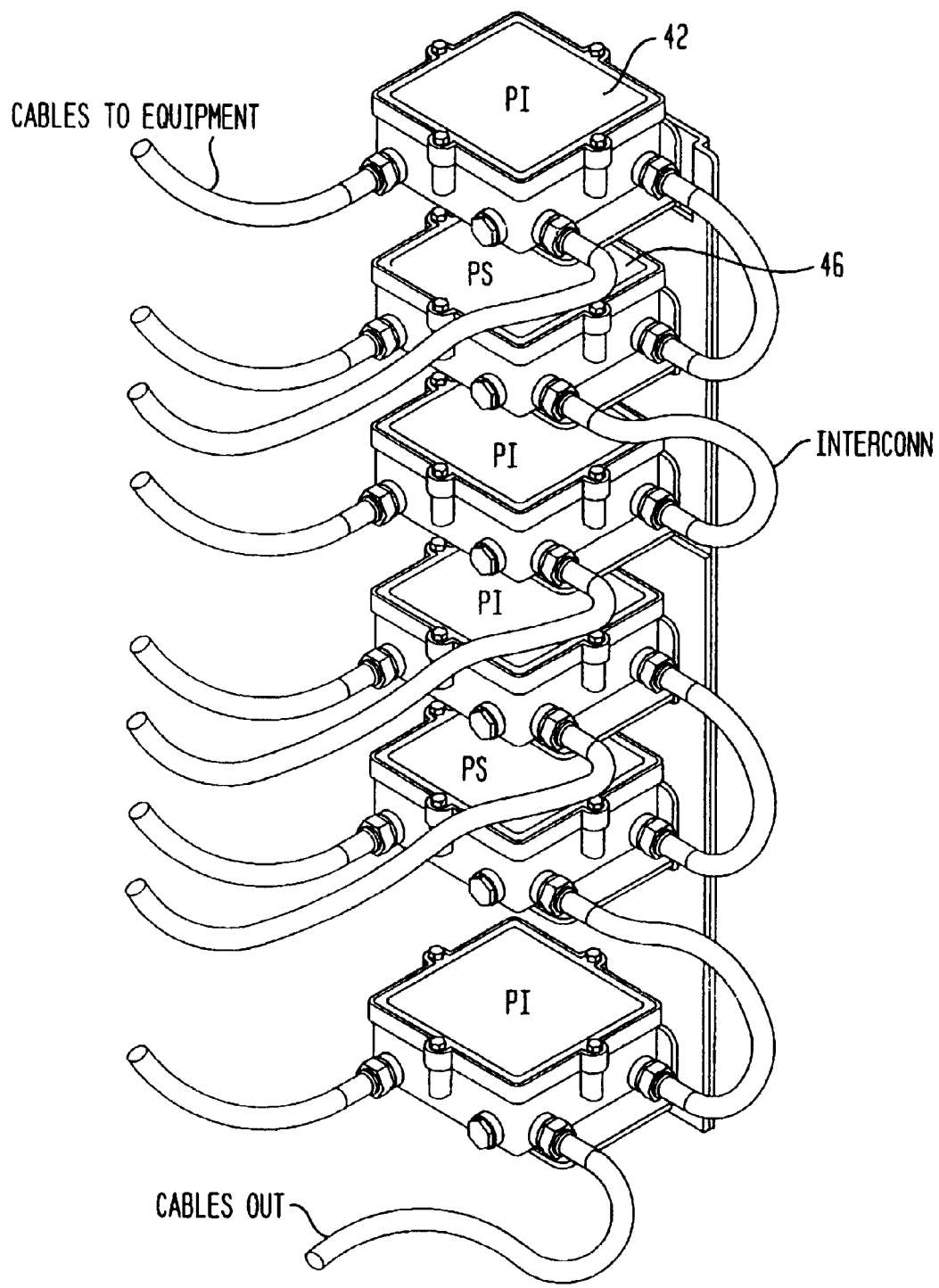
FIG. 3 shows a group of power passive devices installed on an exemplary embodiment of a mounting tree according to the present invention.

In order to save additional space, the power passive devices are mounted in the corner of the cabinet 32. In order to permit this corner placement, the ports of the power passive devices must be configured so that the entry and exit cables are positioned at right angles to these devices as shown in FIG. 3. This configuration also keeps the power passive cables out of the way of other cables entering the area above the power passive devices.

Figure 4:
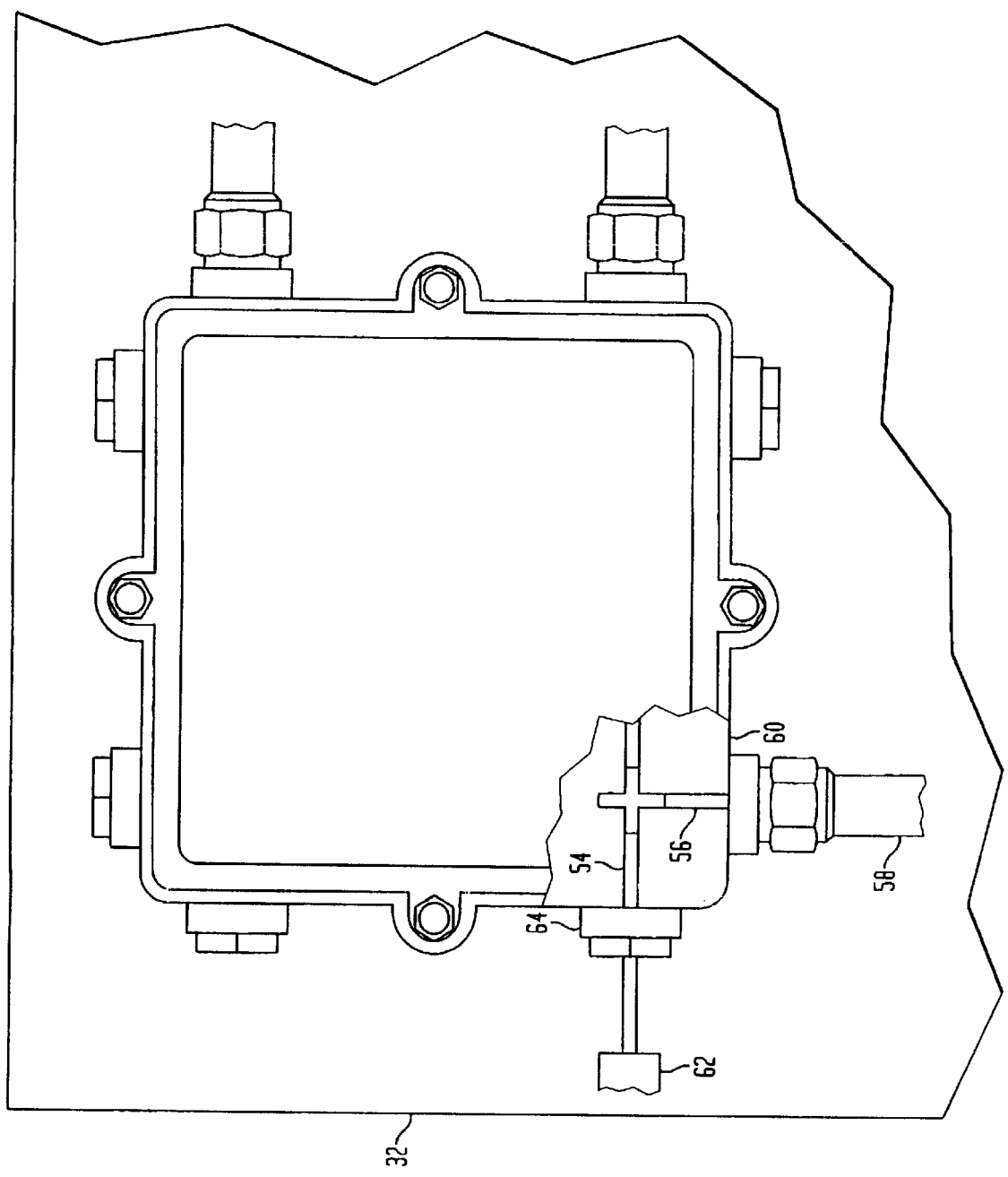
FIG. 4 shows a top view of one of the passive devices shown in FIG. 3.

In some conventional cabinets, the power passive devices are attached to a bracket that cannot be removed from the cabinet. This bracket impedes access to a port through which the cables are connected to the power passive devices. As shown in FIG. 4, the bracket impedes access to a screw 54 on the side of a coaxial pin 56 of the cable assembly 58 through port 60, which screw 54 must be adjusted by means of a screwdriver 62 passed through port 64 in order to connect or disconnect cables to a passive device.

While making the foregoing bracket removable would enable the cables in the cabinet to be more easily accessed, another problem would result from doing so. Specifically, since the bracket is secured to the cabinet using hardware fasteners that are placed though the outer walls of the cabinet prior to its being painted, removing and then reinstalling the bracket would damage the finish and require that the exterior of the cabinet be repainted.

Figure 5:
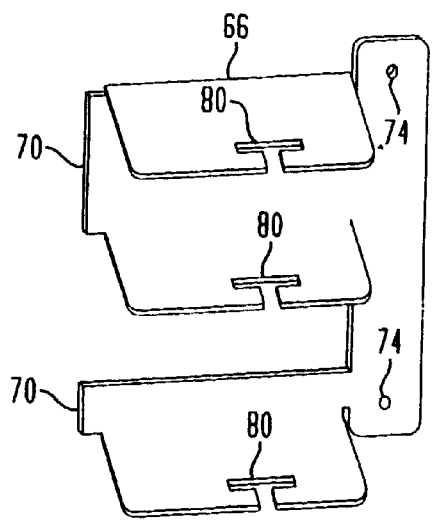
FIG. 5 shows a side view of an exemplary embodiment of the mounting tree according to the present invention.
Figure 6:
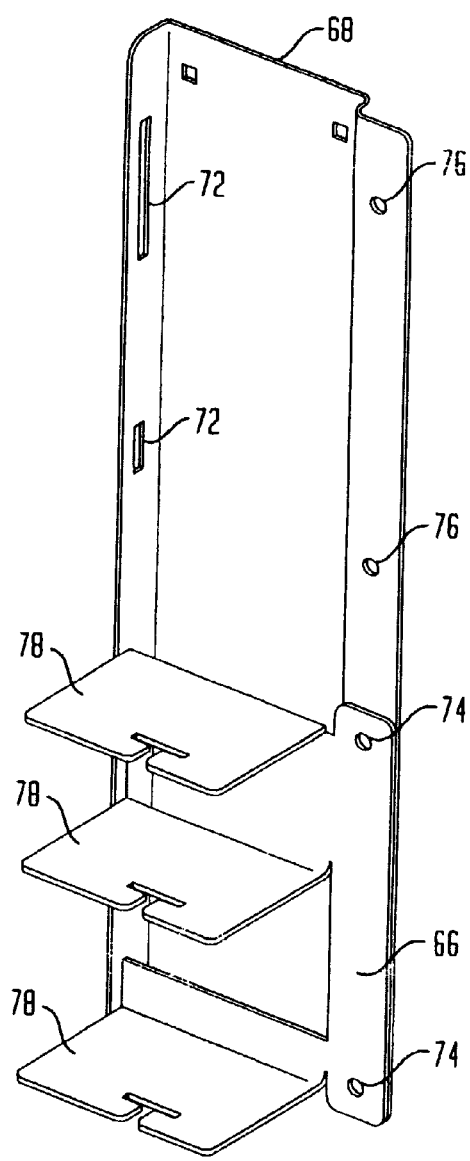
FIG. 6 shows an exemplary embodiment of an intermediate mounting bracket with one mounting tree installed therein according to the present invention.

The present invention employs an intermediate mounting bracket to overcome the foregoing problems. FIG. 5 shows a side view of an exemplary embodiment of the mounting tree 66 according to the present invention. FIG. 6 shows an exemplary embodiment of an intermediate mounting bracket 68 with one mounting tree installed thereon according to the present invention. The intermediate bracket 68 is permanently fastened to the inner wall of the cabinet 32 and is configured to hold a removable mounting tree 66. On one side, the mounting tree 66 is attached to the intermediate mounting bracket 68 by means of a pair of tabs 70 that slide into a pair of slots 72 in the intermediate mounting bracket 68. On the opposite side, the mounting tree 66 is attached to the intermediate mounting bracket 68 by fasteners such as self-threading screws which are not shown and which are inserted through holes 74 in the mounting tree into holes 76 in the intermediate mounting bracket 68.

During installation, the power passive devices 42 and 46 are first attached to the mounting tree 66 with the cables attached as shown in FIG. 3. The cable mounting tree subassembly can then be easily handled and installed onto the intermediate mounting bracket 68. The mounting tree 66 can be gripped with one hand, while the tabs 70 are inserted into the slots 72 with the other hand. Once the tabs 70 are inserted, they secure the mounting tree 66 to the intermediate bracket 68 such that the mounting tree 66 can be released and the fasteners inserted into the holes 74 and 76. As can be seen in FIG. 2, two power inserters 42 and one power splitter 46 form a group of three power passive devices. In a preferred embodiment of the present invention shown in FIGS. 5 and 7, each mounting tree 66 likewise holds a group of three power passive devices.

Figure 7:
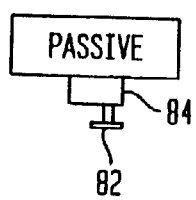
FIG. 7 shows a side view of a conventional power passive device mounted on the mounting tree shown in FIG. 5.

The three mounting surfaces 78 of the mounting tree 66 can be inexpensively manufactured from a single sheet of metal. Referring to FIGS. 5 and 7, the mounting tree 66 has a T-shaped slot 80 that allows each power passive device to be attached to the tree 66 without removing a screw 82 that is typically attached to the bottom of such devices. Consequently, to install either a power inserter 42 or power splitter 46, the screw 82 need only be loosened and the device slid into position. The T-shape of slot 80 is configured to capture a protruding feature 84 on the bottom of the power passive devices to prevent such devices from rotating during the tightening or loosening of the screw 82.

In a preferred installation procedure, the power passive devices are installed on the mounting tree 66 prior to their placement into the cabinet 32. The coaxial cabling is first connected between these devices. They are then attached to the mounting tree 66, and screw 82 is tightened. The foregoing assembly can be accomplished on a work bench much more easily than can the more difficult process employed with conventional cabinets which requires handling an interconnected set of power passive devices and then trying to secure them in the cabinet with a wrench. After installation, the mounting apparatus of the present invention makes it possible to remove and reinstall a power passive device on the mounting tree 66 while the tree 66 remains inside the cabinet.

Numerous modifications to and alternative embodiments of the present invention will be apparent to those skilled in the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications which come within the scope of the appended claims is reserved.

What is claimed is:

1. A cabinet for housing a plurality of electrical devices, comprising:

at least two adjacent wall members disposed at an angle with respect to each other to form an interior corner area;

an intermediate mounting bracket affixed to one of said walls in said interior corner area;

a mounting tree having an attachment portion removably engaged with the said intermediate mounting bracket, the mounting tree including a plurality of shelves protruding from the mounting tree and configured to hold at least one of the electrical devices; and means removably attaching the electrical devices to the shelf, wherein the mounting tree can be removed from the intermediate mounting bracket while the electrical devices are still attached to the shelves.

2. The cabinet according to claim 1, wherein the electrical devices each include at least one serviceable area not accessible for servicing when the electrical device on the mounting tree is attached to the intermediate mounting bracket.

3. The cabinet according to claim 1, wherein at least one of the electrical devices includes cable terminals for attaching cables on two sides of the one electrical device such that the cables on each side are generally parallel to one adjacent wall.

4. The cabinet according to claim 1, wherein the intermediate mounting bracket is a generally flat member attached to one of the walls.

5. The cabinet according to claim 1 further comprising a second mounting tree removably engaged with the intermediate mounting bracket, the second mounting tree being mounted on the intermediate mounting bracket adjacent to the mounting tree.

6. The cabinet according to claim 1, wherein the mounting tree further comprises three shelves configured for holding at least two different types of electronic devices.

7. The cabinet according to claim 6, wherein the mounting tree is formed from a single metal member.

8. The cabinet according to claim 6, wherein at least one of the electrical devices is a power inserter and at least one of the devices is a power splitter.

9. The cabinet according to claim 1, wherein the mounting tree includes means for engaging the intermediate mounting bracket, wherein the mounting tree can be held in place by the engaging means before any fastening elements are installed.

10. The cabinet according to claim 1, further comprising a plurality of cables attached to the electrical devices, wherein the serviceable area contains a fastener for securing the cables to the electrical devices.

11. A mounting apparatus attaching electrical devices to an enclosure having a wall and an interior corner, comprising:

an intermediate mounting bracket affixed to the wall in the interior corner area of said enclosure;

a mounting tree having an attachment portion at one side removably engaged with the intermediate mounting bracket, the mounting tree including a plurality of shelves, each one of the shelves protruding from the mounting tree and holding at least one of the electrical devices; and means removably attaching the electrical devices to the shelves, wherein the mounting tree can be removed from the intermediate mounting bracket while the electrical devices are still attached to the shelves.

12. The mounting apparatus according to claim 11, wherein each electrical device includes at least one serviceable area not accessible within the enclosure when the electrical device on the mounting tree is attached to the intermediate mounting bracket.

13. The mounting apparatus according to claim 11, further comprising a plurality of cables attached to the electrical devices, wherein the serviceable area contains a fastener for securing the cables to the electrical devices.

14. A mounting apparatus according to claim 13, wherein at least one of the electrical devices includes cable terminals for attaching cables on two sides of the one electrical device such that the cables on each of the two sides are generally parallel to an adjacent wall of the enclosure.

15. The mounting apparatus according to claim 11, wherein the intermediate mounting bracket is a generally flat member attached to the enclosure.

16. The mounting apparatus according to claim 11 further comprising a second mounting tree removably engaged with the intermediate mounting bracket, the second mounting tree being mounted on the intermediate mounting bracket adjacent to the mounting tree.

17. The mounting apparatus according to claim 11, wherein the mounting tree further comprises three shelves configured for holding at least two different types of electronic devices.

18. The cabinet according to claim 17, wherein the mounting tree is formed from a single metal member.

19. The mounting apparatus according to claim 18, wherein at least one of the electrical devices is a power inserter and at least one of the devices is a power splitter.

20. The mounting apparatus according to claim 11, wherein the attachment portion on said mounting tree includes at least one protruding tab on the mounting tree removably engaged with a slot on the intermediate mounting bracket.

* * * * *